US008548995B1

(12) United States Patent
Curtiss (10) Patent No.: US 8,548,995 B1
(45) Date of Patent: Oct. 1, 2013

(54) RANKING OF DOCUMENTS BASED ON ANALYSIS OF RELATED DOCUMENTS (75) Inventor: Michael Curtiss, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 425 days.

(21) Appl. No.: 10/658,452

(22) Filed: Sep. 10, 2003

(51) Int. Cl.
*G06F 17/30* (2006.01)

(52) U.S. Cl.
USPC ........... 707/731; 707/727; 707/728; 707/748; 707/726; 707/735

(58) Field of Classification Search
CPC ................................. G06F 17/30; G06F 17/00
USPC .......................................................... 707/3, 6
See application file for complete search history.

(56) References Cited

U.S. PATENT DOCUMENTS

| 4,823,306 | A | * | 4/1989 | Barbic et al. | 1/1 |
| 5,855,015 | A | * | 12/1998 | Shoham | 715/205 |
| 5,864,846 | A | * | 1/1999 | Voorhees et al. | 1/1 |
| 5,918,236 | A | * | 6/1999 | Wical | 715/209 |
| 5,920,854 | A | * | 7/1999 | Kirsch et al. | 1/1 |
| 5,963,940 | A | * | 10/1999 | Liddy et al. | 1/1 |
| 5,983,221 | A | * | 11/1999 | Christy | 1/1 |
| 6,038,560 | A | * | 3/2000 | Wical | 1/1 |
| 6,067,552 | A | * | 5/2000 | Yu | 715/234 |
| 6,070,158 | A | * | 5/2000 | Kirsch et al. | 1/1 |
| 6,070,176 | A | * | 5/2000 | Downs et al. | 715/234 |
| 6,112,203 | A | * | 8/2000 | Bharat et al. | 1/1 |
| 6,119,114 | A | * | 9/2000 | Smadja | 1/1 |
| 6,138,113 | A | * | 10/2000 | Dean et al. | 715/208 |
| 6,185,550 | B1 | * | 2/2001 | Snow et al. | 1/1 |
| 6,189,002 | B1 | * | 2/2001 | Roitblat | 1/1 |
| 6,285,999 | B1 | * | 9/2001 | Page | 707/5 |
| 6,292,830 | B1 | * | 9/2001 | Taylor et al. | 709/224 |
| 6,321,228 | B1 | * | 11/2001 | Crandall et al. | 1/1 |
| 6,502,081 | B1 | * | 12/2002 | Wiltshire et al. | 706/12 |
| 6,526,440 | B1 | * | 2/2003 | Bharat | 709/219 |
| 6,581,057 | B1 | * | 6/2003 | Witbrock et al. | 1/1 |
| 6,591,261 | B1 | * | 7/2003 | Arthurs | 1/1 |
| 6,766,316 | B2 | * | 7/2004 | Caudill et al. | 1/1 |
| 6,778,997 | B2 | * | 8/2004 | Sundaresan et al. | 1/1 |
| 6,829,599 | B2 | * | 12/2004 | Chidlovskii | 1/1 |
| 6,842,876 | B2 | * | 1/2005 | Schilit et al. | 715/256 |
| 6,848,077 | B1 | * | 1/2005 | McBrearty et al. | 715/206 |
| 6,901,399 | B1 | * | 5/2005 | Corston et al. | 1/1 |
| 6,947,920 | B2 | * | 9/2005 | Alpha | 1/1 |
| 6,965,900 | B2 | * | 11/2005 | Srinivasa et al. | 1/1 |
| 7,003,513 | B2 | * | 2/2006 | Geiselhart | 1/1 |
| 7,146,409 | B1 | * | 12/2006 | Bushee et al. | 709/219 |

(Continued)

OTHER PUBLICATIONS

Brian Amento, Loren Terveen, and Will Hill; "Does 'Authority' Mean Quality? Predicting Expert Quality Rating of Web Documents"; ACM-SIGIR; Jul. 2000, pp. 296-303.*

(Continued)

*Primary Examiner* — Farhan Syed
(74) *Attorney, Agent, or Firm* — Harrity & Harrity, LLP (57) ABSTRACT A ranking component refines an initial document ranking in which the initial ranking is based on a scoring criterion. The ranking component generates or receive a set of documents that are related to a document. The set of documents may be related in a number of ways, such as similarity in authorship or publisher. The ranking component then applies the scoring criterion to the set of related documents to generate a related set score. The related set score is used to refine the initial rankings.

26 Claims, 6 Drawing Sheets (56) References Cited

U.S. PATENT DOCUMENTS

| | | | |
|---|---|---|---|
| 7,197,497 B2* | 3/2007 | Cossock | 1/1 |
| 7,254,587 B2* | 8/2007 | Lee et al. | 1/1 |
| 7,260,571 B2* | 8/2007 | Amitay et al. | 1/1 |
| 7,505,964 B2* | 3/2009 | Tong et al. | 1/1 |
| 7,610,281 B2* | 10/2009 | Gandhi et al. | 1/1 |
| 7,739,264 B2* | 6/2010 | Jones et al. | 707/713 |
| 7,836,391 B2* | 11/2010 | Tong | 715/234 |
| 7,962,479 B2* | 6/2011 | Jones et al. | 707/728 |
| 7,996,396 B2* | 8/2011 | Leblang et al. | 707/727 |
| 8,024,326 B2* | 9/2011 | Tong et al. | 707/721 |
| 8,024,327 B2* | 9/2011 | Tunkelang et al. | 707/722 |
| 8,086,594 B1* | 12/2011 | Cao et al. | 707/713 |
| 8,086,619 B2* | 12/2011 | Haahr et al. | 707/765 |
| 8,086,631 B2* | 12/2011 | Gollapudi et al. | 707/771 |
| 8,224,827 B2* | 7/2012 | Dean et al. | 707/748 |
| 8,250,092 B2* | 8/2012 | Gollapudi et al. | 707/771 |
| 8,266,143 B2* | 9/2012 | Dean et al. | 707/725 |
| 8,380,705 B2* | 2/2013 | Tong et al. | 707/721 |
| 2003/0115188 A1* | 6/2003 | Srinivasa et al. | 707/3 |
| 2003/0217052 A1* | 11/2003 | Rubenczyk et al. | 707/3 |
| 2003/0220913 A1* | 11/2003 | Doganata et al. | 707/3 |
| 2004/0059726 A1* | 3/2004 | Hunter et al. | 707/3 |
| 2004/0128273 A1* | 7/2004 | Amitay et al. | 707/1 |
| 2004/0236725 A1* | 11/2004 | Amitay et al. | 707/3 |
| 2005/0010605 A1* | 1/2005 | Conrad et al. | 707/104.1 |
| 2005/0060311 A1* | 3/2005 | Tong et al. | 707/7 |
| 2005/0154761 A1* | 7/2005 | Lee et al. | 707/104.1 |
| 2006/0271524 A1* | 11/2006 | Tanne et al. | 707/3 |
| 2007/0174340 A1* | 7/2007 | Gross | 707/104.1 |
| 2007/0192369 A1* | 8/2007 | Gross | 707/104.1 |
| 2007/0234140 A1* | 10/2007 | Lee et al. | 714/715 |
| 2008/0010270 A1* | 1/2008 | Gross | 707/5 |
| 2008/0016050 A1* | 1/2008 | Stensmo | 707/4 |
| 2008/0114721 A1* | 5/2008 | Jones et al. | 707/2 |
| 2008/0126335 A1* | 5/2008 | Gandhi et al. | 707/5 |
| 2008/0140699 A1* | 6/2008 | Jones et al. | 707/102 |
| 2009/0216696 A1* | 8/2009 | Downs et al. | 706/20 |
| 2010/0131523 A1* | 5/2010 | Yu et al. | 707/756 |
| 2011/0029517 A1* | 2/2011 | Ji et al. | 707/734 |
| 2011/0040787 A1* | 2/2011 | Cierniak et al. | 707/770 |
| 2011/0191310 A1* | 8/2011 | Liao et al. | 707/706 |
| 2012/0016888 A1* | 1/2012 | Dean et al. | 707/749 |
| 2012/0089588 A1* | 4/2012 | Gollapudi et al. | 707/706 |
| 2012/0209838 A1* | 8/2012 | Dean et al. | 707/725 |
| 2012/0290926 A1* | 11/2012 | Kapadia et al. | 715/255 |

OTHER PUBLICATIONS

Bharat, K. and Henzinger, M., "Improved Algorithms for Topic Distillation in a Hyperlinked Environment," Aug. 1998, ACM SIGIR '08, Melbourne, Australia, pp. 104-111.*

Osinski, Stanislaw, "An Algorithm for Clustering of Web Search Results," Jun. 2003, Master Thesis, Poznan University of Technology, Poland, pp. 1-101.*

* cited by examiner

RANKING OF DOCUMENTS BASED ON ANALYSIS OF RELATED DOCUMENTS

BACKGROUND OF THE INVENTION

A. Field of the Invention

The present invention relates generally to the ranking of documents and, more particularly, to techniques for refining the ranking of an initial set of documents.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. Determining appropriate scores can be a difficult task. For one thing, the importance of a web page to the user is inherently subjective and depends on the user's interests, knowledge, and attitudes. There is, however, much that can be determined objectively about the relative importance of a web page. Conventional methods of determining relevance are based on the contents of the web page. More advanced techniques determine the importance of a web page based on more than the content of the web page. For example, one known method, described in the article entitled "The Anatomy of a Large-Scale Hypertextual Search Engine," by Sergey Brin and Lawrence Page, assigns a degree of importance to a web page based on the link structure of the web page. In other words, the Brin and Page algorithm attempts to quantify the importance of a web page based on more than just the content of the web page.

In addition to conventional query-based engines, other systems exist that return documents in which it may be desirable to rank the documents. For example, a returned set of news articles about a particular news topic may be ranked. Postings gathered from message groups, such as Usenet groups, may also be ranked when returned to the user.

In any system that ranks documents, the general goal of the system is to rank the documents so that the more desirable documents are ranked higher. Thus, in such systems, improvements to the ranking technique are desirable.

SUMMARY OF THE INVENTION

The present invention is directed to a document ranking technique in which, for a given document, a set of related documents is determined. A related score is calculated based on the related document. The score may then be used to modify an original ranking of the given document.

One aspect of the invention is directed to a method for scoring documents. The method comprises obtaining an initial set of documents and generating a set of related documents for at least one document in the initial set of documents using a similarity criterion. The method further includes generating a related set score by applying a related set criterion to the set of related documents corresponding to the at least one document and scoring the at least one document using the related set score.

Another aspect of the invention is directed to a method for refining a ranking associated with a document. The method includes obtaining a set of documents related to the document, calculating a relevance ranking for the set of documents using a criterion, and modifying the ranking associated with the document based on the relevance ranking for the set of documents.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention. Instead, the scope of the invention is defined by the appended claims and equivalents.

As described herein, a ranking component refines the initial rankings of documents that are initially ranked via a scoring criterion. The ranking component may generate or receive a set of documents that are related to a given document. The ranking component may then apply a scoring criterion to the set of related documents to generate a related set score. The related set score may be used to refine the initial rankings.

Exemplary Network Overview

Figure 1:
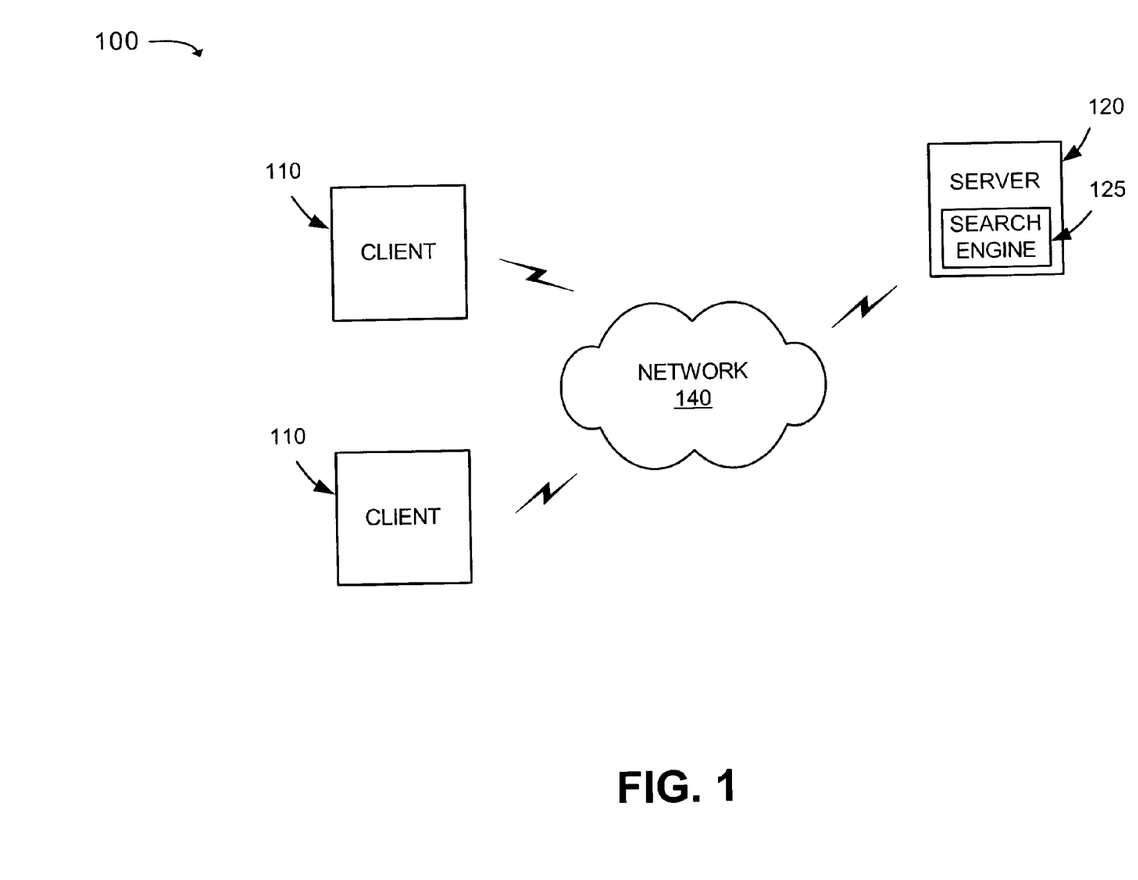
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated as connected to network 140 for simplicity. In practice, there may be more or less clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

In an implementation consistent with the principles of the invention, server 120 may include a search engine 125 usable by clients 110. Search engine 125 may be a search engine such as a query-based web page search engine, a news server, or a Usenet message server or archiving source. One of ordinary skill in the art will recognize that other implementations of a search engine are possible. In general, in response to a client request, search engine 125 returns sets of documents to the client. These documents may be ranked and displayed in a ranking order determined consistent with aspects of the invention.

A document, as the term is used herein, is to be broadly interpreted to include any machine-readable and machine-storable work product. A document may be an email, a file, a combination of files, one or more files with embedded links to other files, a news group posting, etc. In the context of the Internet, a common document is a Web page. Web pages often include content and may include embedded information (such as meta information, hyperlinks, etc.) and/or embedded instructions (such as Javascript, etc.).

Exemplary Client/Server Architecture

Figure 2:
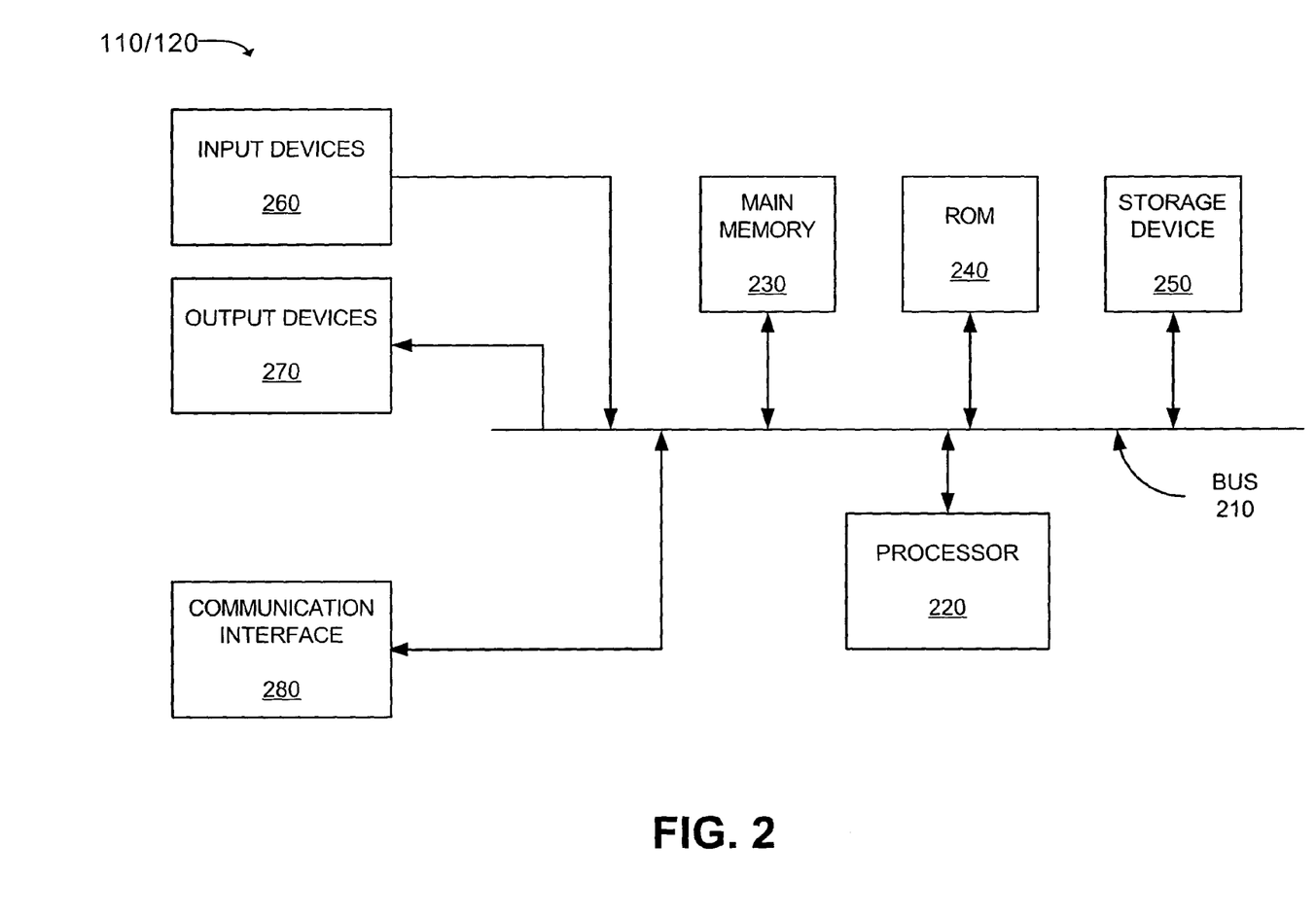
FIG. 2 is an exemplary diagram of a client or server according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device (s) 270 may include one or more conventional mechanisms that output information to the user, including a display, a printer, a speaker, etc. Communication interface 280 may include any transceiver-like mechanism that enables client 110 to communicate with other devices and/or systems. For example, communication interface 280 may include mechanisms for communicating with another device or system via a network, such as network 140.

As will be described in detail below, server 120, consistent with the principles of the invention, performs certain searching or document retrieval related operations through search engine 125. Search engine 125 may be stored in a computer-readable medium such as memory 230. A computer-readable medium may be defined as one or more physical or logical memory devices. and/or carrier waves.

The software instructions defining search engine 125 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Search Engine 125

Figure 3:
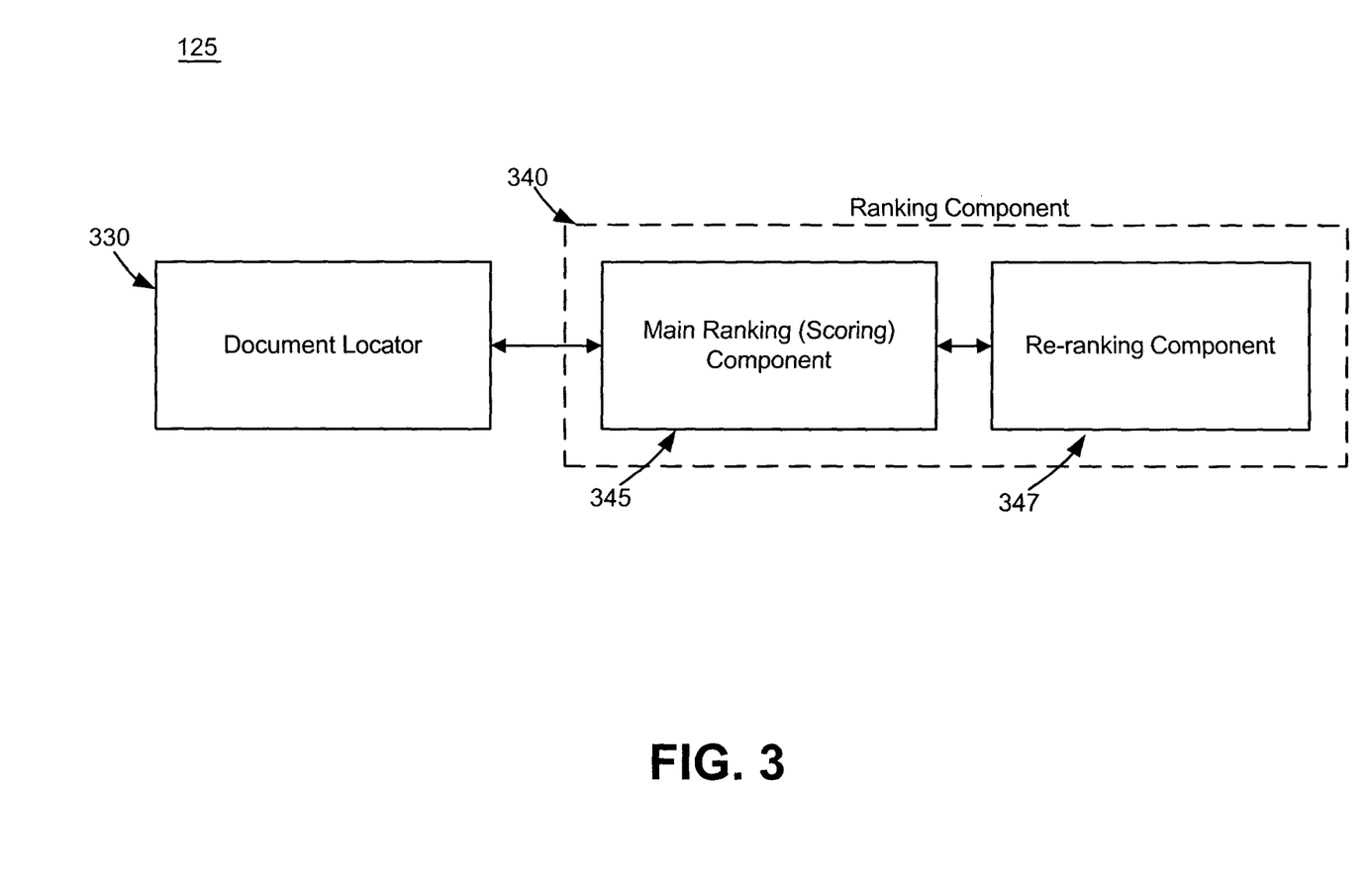
FIG. 3 is a block diagram illustrating an implementation of an exemplary search engine.

FIG. 3 is a block diagram illustrating an implementation of search engine 125 in additional detail. In this implementation, search engine 125 is described as a traditional search engine that returns a ranked or ordered set of documents related to a user query. In general, however, search engine 125 may be thought of as any of a number of services or applications that rank or order a set of input documents. For example, a set of documents that are classified by topic or a set of postings gathered from message groups, such as Usenet groups, may also be ranked when returned to the user. Search engine 125 may also be a specialized search engine, such as a news search engine.

Search engine 125 may include a document locator 330 and a ranking component 340. In general, document locator 330 finds a set of documents whose contents match a user search query. Ranking component 330 further ranks the located set of documents based on relevance. A more detailed description of the functionality implemented by search engine 125, document locator 330, and ranking component 340 will be described below.

Document locator 330 may initially locate documents from a document corpus by comparing the terms in the user's search query to the documents in the corpus. In general, processes for indexing documents and searching the indexed corpus of documents to return a set of documents containing the searched terms are well known in the art. Accordingly, this functionality of relevant document component 330 will not be described further herein.

Ranking component 340 assists search engine 125 in returning relevant documents to the user by ranking the set of documents identified by document locator 330. This ranking may take the form of assigning a numerical value corresponding to the calculated relevance of each document identified by document locator 330. Ranking component 340 includes main ranking component 345 and re-ranking component 347. Main ranking component 345 assigns an initial rank (a score) to each document received from document locator 330. The initial rank value corresponds to a calculated relevance of the document. There are a number of suitable ranking algorithms known in the art. One of which is described in the article by Brin and Page, as mentioned in the Background of the Invention section of this disclosure. Alternatively, the functions of main ranking component 345 and document locator 330 may be combined so that document locator 330 produces a set of relevant documents each having rank values. In this situation, the rank values may be generated based on the relative position of the user's search terms in the returned documents. For example, documents may have their rank value based on the proximity of the search terms in the document (documents with the search terms close together are given higher rank values) or on the number of occurrences of the search term (e.g., a document that repeatedly uses a search term is given a higher rank value).

Figure 4:
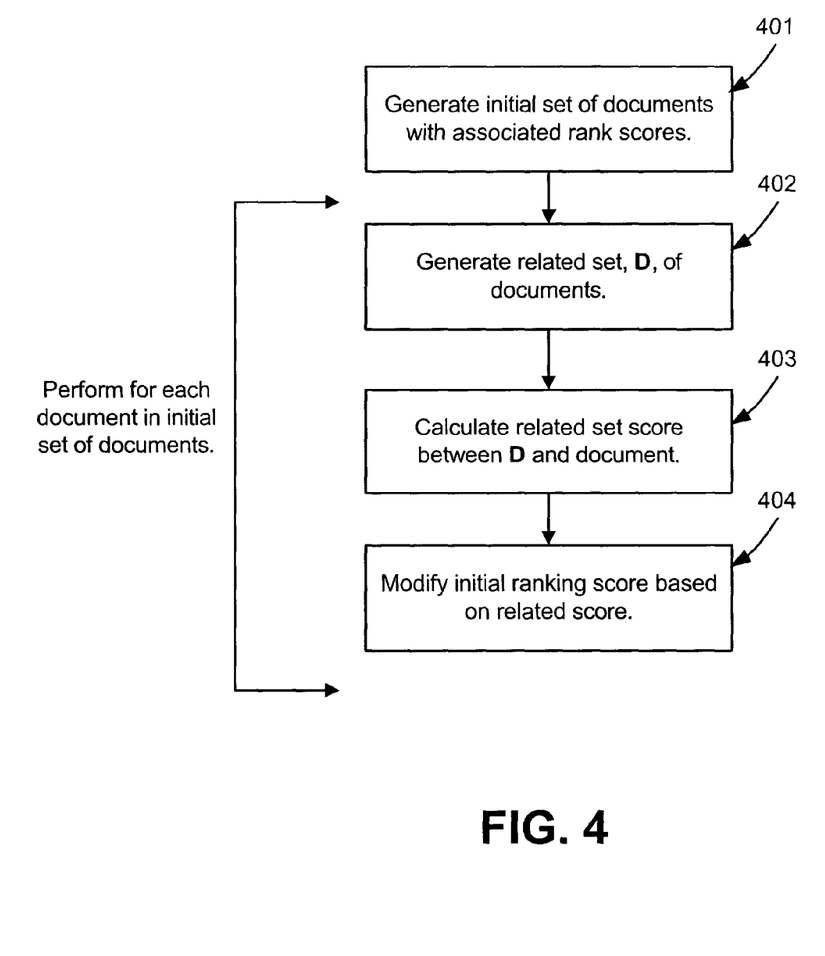
FIG. 4 is a flow chart illustrating methods consistent with the present invention for implementing the re-ranking component shown in FIG. 3.

The initial ranking scores assigned by main ranking component 345 may be refined by re-ranking component 347 to improve the relevance scores. FIG. 4 is a flow chart illustrating methods consistent with the present invention for implementing re-ranking component 347. In some implementations, the functions performed by main ranking component 345 and re-ranking component 347 may be combined as a single ranking component 340.

As previously mentioned, document locator 330 may return an initial set of documents, such as a set of documents generated in response to a user search query (act 401). Each of the documents in the initial set of documents may be initially ranked based on some scoring criterion that may generate a rank score or value for each document in the initial set of documents. The criterion may be based on, for example, a user search query, a topic (e.g., sports), a list of keywords, a geographical area, or similarity to another document or set of documents.

Based on the initial set of documents, re-ranking component 347 may then generate one or more sets of related documents (act 402). In one implementation, a set of related documents may be generated for each document, d, in the initial set of documents. The related sets of documents will be referred to herein as a related set D, which includes documents $d_1, d_2, \ldots, d_n$, where n is a positive integer greater than or equal to one. The related set D may be drawn from all documents known to search engine 125, or may be drawn from any desired subset of documents.

Based on the related set D and a scoring criterion (which may be any criterion, whether the same as, related or similar to, independent of, etc., the original scoring criterion), re-ranking component 347 may compute a related set score for D (act 403). The related set score may be based on a matching procedure between the document d and the related set D, or a subset of the related set D. The initial ranking score for document d may then be modified based on the related set score (act 404).

Generating a Related Set D (Act 402)

A number of techniques may be used to compute the set of related documents D for a particular document d in the initial set. In general, the documents in D are determined as documents that re-ranking component 347 determines to be somehow similar to document d.

In one implementation, similarity between document d and another document may be based on authorship or publication information. This type of similarity criteria can be particularly useful in the context of news articles. For example, if news articles are being ranked, one similarity criterion may be defined from the news source that published the news article d. The related set D may then be defined as a set of documents published by the same source as news article d. Thus, if d is an article from the New York Times then D may be the set of previous articles published by the New York Times.

Another news article based similarity criteria may be defined as news articles having the same author as the news article d. Under this criteria, other articles written by the same journalist may form related set D. For example, if document d is an article by Thomas Friedman, the related set D may be the set of previous articles by Thomas Friedman.

Yet another possible news article based similarity criterion may be defined as news articles from the same or similar publication sections. In the context of a newspaper, for example, the similarity criterion may be the same newspaper section. Other articles from the same section (e.g., "sports" or "business") could be used to form related set D. If document d is an article in the "business" section then related set D could be defined as the set of other articles in the "business" sections of any newspaper.

Similarity criteria may be defined that are more specific to message groups, such as Usenet postings. In one implementation, a similarity criteria may be based on the author, where the author is defined by the email address of the poster. Thus, other postings by the same email address may form the related set D.

Search engine 125 may be used to search postings from multiple message groups. In this situation, a similarity criteria may be based on the group in which the posting appears. Other articles in the same message group would be considered related by this criterion. For example, if document d is a posting in the news group "soc.culture.Ethiopia," the related set D may be defined as all the other postings from the news group "soc.culture.Ethiopia." Another similarity criteria that can be used for message groups may be based on the thread in which the posting occurred. Thus, the related set D may be defined as all the other postings in the same thread as posting d. This similarity criteria will tend to return smaller sets than one based on the news group.

As mentioned previously, search engine 125 may implement a general web page search engine. In this situation, in which web pages are being ranked, the similarity criteria may define the related set D as other web pages from the same web site as document d, as web pages that link to document d, or as web pages to which document d contains a link. The same web site, as used herein, can broadly refer to documents on the same host or in the same domain. In some implementations, it may be desirable to define a same web site to cover multiple hosts or domains that are somehow related, such as, for example, a news publisher that publishes articles on multiple hosts or under multiple domain names.

As can be appreciated from the above discussion, the similarity criteria may be defined in many different ways, depending on the particular situation. In general, one of ordinary skill in the art will appreciate that numerous other classification or clustering techniques can be used to identify a set of related documents to a given document. The related documents in related set D can be pre-computed or generated when necessary. Further, one of ordinary skill in the art will recognize that combinations of the above-discussed similarity criteria or other similarity criteria may be used to define related set D.

Generating a Related Set Score (Act 403)

Given the related set D and the original scoring criterion, in act 403, re-ranking component 347 computes the related set score for document d. In another implementation, the search query may be classified and the classification may be compared to the pseudo-document. For example, assume the original search query is "New York Yankees." This query may be classified as a "Sports" query, and the pseudo-document may be compared based on how well it matches the topic of sports.

Figure 5:
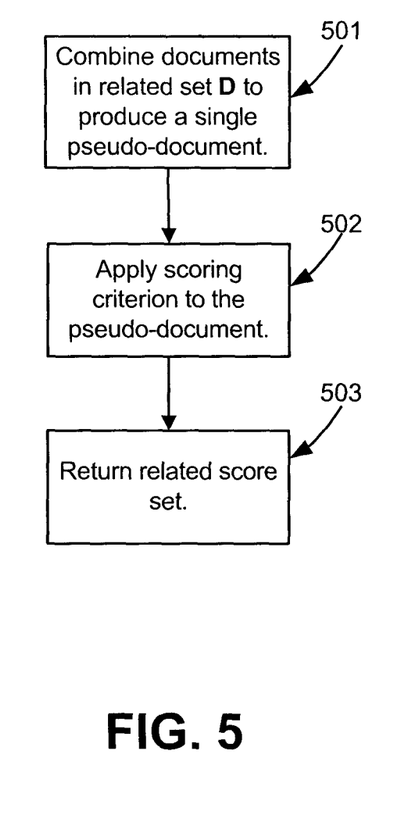
FIG. 5 is a diagram illustrating operations consistent with aspects of the invention for computing a related set score.

FIG. 5 is a diagram illustrating exemplary operations consistent with aspects of the invention for computing the related set score. Re-ranking component 347 may combine the documents in the related set D to produce a single "pseudo-document" (act 501). The documents in D may be combined via straightforward concatenation. A match between the pseudo-document and the initial scoring criterion may then be performed (act 502). If the initial scoring criteria is based on a search query, for example, the search query can be compared to the pseudo-document in the same manner that the search query was compared to the main document corpus from which the initial set of documents were generated. In other implementations, a different scoring criterion, such as one related to the original scoring criterion, may be used to compute the related set score. The result of this comparison may be a ranking score. The ranking score may be returned as the related set score (act 503) (act 50).

Figure 6:
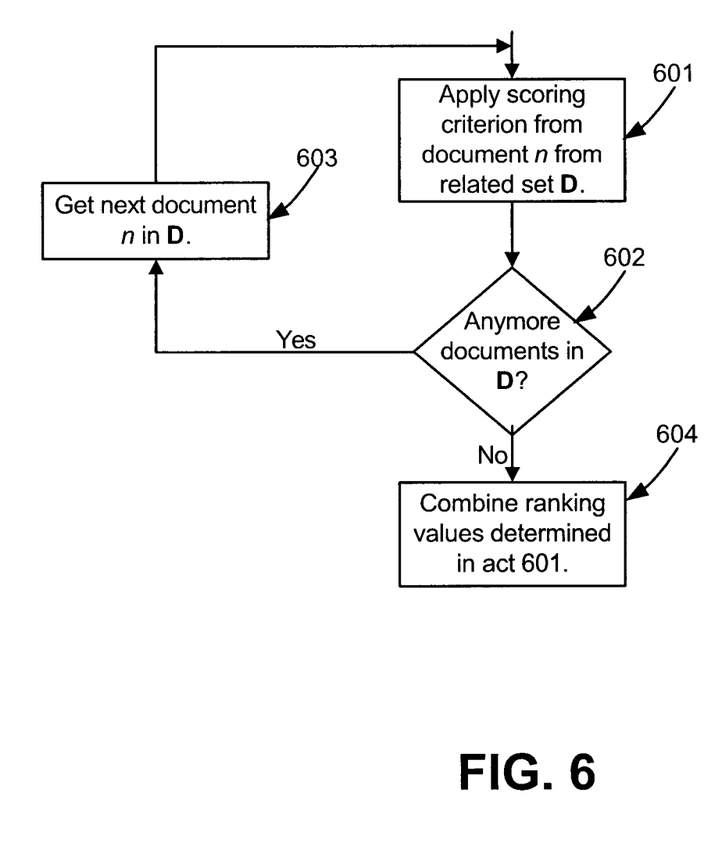
FIG. 6 is a diagram an alternate implementation consistent with aspects of the invention for computing the related set score.

FIG. 6 is a diagram of an exemplary alternate implementation consistent with aspects of the invention for computing the related set score. This implementation is similar to that shown in FIG. 5, except that instead of combining the documents in the related set D to form a pseudo-document, each document n in D is individually matched to the initial scoring criterion in a manner similar to the matching performed in act 502 (act 601). When all the documents in D have been evaluated to obtain a ranking value, (acts 602 and 603), the ranking values may be combined to obtain the related set score (act 604). The ranking values may be combined via a number a possible functions, such as an average value, a weighted average value, a sum, etc.

When the initial scoring criteria is based on geography, another possible technique for determining the related set score can include determining a geographical relevance vector of each document in related set D. For example, based on terms in the documents in D, a vector may be generated over all the documents in D, in which the vector defines a set of geographic scores. The geographic scores may represent a confidence level that the documents in related set D are relevant to a particular geographic region. For example, an exemplary vector for a particular related set D may include three non-zero confidence scores, such as (USA, 0.5), (Europe, 0.4), (Asia, 0.05). This vector may be matched with a geographic ranking criterion, such as the geographic search query "USA," to produce the related set score. As a possible modification to this technique, the vector can be generated based on the source of each of the documents in D instead of on the documents themselves.

When the initial scoring criterion is based on topics, another possible technique for determining the related set score can include determining a topic of each document in related set D. The topics may be generated using automated classification techniques or drawn from either manually or automated pre-generated classification information (e.g., a hierarchical web directory tree). The topics for the documents in related set D may be combined to produce a vector of topic scores that defines confidence levels in the topics. The vector of topic scores can then be matched with the ranking criterion, in a manner similar to that described above, to produce the related set score.

In another possible technique for determining the related set score, a set of terms that are "strong" in each document in the related set D may be determined and combined to produce a vector of final strong terms for the documents in D. The determination of whether a term is "strong" can be based on, for example, a pre-determined list of terms or terms that are determined to have an inverse document frequency (idf) above a threshold level. The idf of each term in a document may be defined based on a ratio of the number of occurrences of the term in the document to the relative frequency of the term in the language or over the entire document corpus. Thus, terms that are generally less common in the corpus but that occur frequently in the document will have a high idf and may be classified as being strong. The final vector of strong terms can then be matched with the given ranking criterion (e.g., a search query) to produce the related set score.

As can be appreciated from the above discussion, the related set score can be defined in many different ways, depending on the particular situation.

Modifying the Initial Ranking Score (Act 404)

The related set score and the initial ranking score for each document d may be combined to produce a modified (final) ranking score for document d. The initial set of documents returned in act 401 may then be re-ranked by re-ranking component 347 based on the modified ranking scores.

In one implementation, the modified ranking score may be calculated as a weighted sum as follows:

$$\alpha(\text{Initial\_Score}) + \beta(\text{Related\_Set\_Score}), \qquad (1)$$

where $\alpha$ and $\beta$ are predetermined constants. The values to use for $\alpha$ and $\beta$ may be determined by one of ordinary skill in the art through empirical trial-and-error techniques. Exemplary values for $\alpha$ and $\beta$ may be 0.8 and 0.2, respectively. As a special case of formula (I), $\alpha$ could be set to zero and $\beta$ could be set to one. In this case, the modified ranking score is equal to the related set score. Thus, in this case, the initial ranking scores may not even need to be calculated.

In another implementation, the modified ranking score may be calculated by using the related set score to boost the initial score as follows:

$$\text{Initial\_Score} \times (1 + \beta \times \text{Related\_Set\_Score}). \qquad (2)$$

As in equation (1), $\beta$ may be a suitable predetermined constant.

Alternate Variations

A number of variations on the above-discussed techniques are possible. In the related set D, for instance, some documents may be weighted more heavily than others. For example, newer documents may be given more weight than older documents. Also, duplicate documents can be discarded or given less weight.

As previously mentioned, combinations of the discussed similarity criteria may be used to define related set D. Thus, for example, for news articles, the source, the journalist, and the section can all be used to define a related set D. Correspondingly, more than one related set score can be computed for each document. The multiple related set scores can then be combined by, for example, a summing or averaging function, and then used in formula (1) or (2).

In other alternate implementations, the related set score can be computed independently of the ranking criteria. For example, the related document set D can be scored based on the length of the included documents, on the timeliness of the documents, on the quality of the documents (determined by, for example, human evaluation or automated techniques based on grammar, spelling, or writing style), or based on popularity or usage characteristics of the documents.

In yet other implementations, there may be no initial criterion and all documents may be given the same initial score/ranking. Related-set ranking can then be applied to differentiate between the documents. Hence, related set ranking can be used (by itself) to create a ranking, or it can be used to modify other initial rankings.

CONCLUSION

The ranking component described above improves the ranking of documents initially ranked through a number of possible existing scoring criterion. The ranking component can be applied, for example, to the ranking of news articles, Usenet postings, or general web searches.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A computer-implemented method performed by one or more server devices, the method comprising:
   identifying, using one or more processors associated with the one or more server devices, a first document;
   determining, using one or more processors associated with the one or more server devices, a first relevance score for the first document,
      determining the first relevance score including:
         comparing a scoring criterion to the first document to determine the first relevance score;
   identifying, using one or more processors associated with the one or more server devices, a set of documents that is related to the first document,
      one or more documents, in the set of documents, and the first document being associated with a same web site;
   calculating, using one or more processors associated with the one or more server devices, a second relevance score for the first document,
      calculating the second relevance score including:
         concatenating documents, in the set of documents, into a single pseudo-document, and
         applying the scoring criterion to the single pseudo-document to obtain the second relevance score,
         applying the scoring criterion to the single pseudo-document including:
            comparing the scoring criterion to the single pseudo-document to obtain the second relevance score;
   calculating, using one or more processors associated with the one or more server devices, a final relevance score for the first document as a weighted sum of the first relevance score and the second relevance score; and
   transmitting, using a communication interface associated with the one or more server devices, a ranked list of documents to a client device,
      the ranked list of documents including the first document,
      the first document being ranked, within the ranked list of documents, based on the final relevance score.

2. The computer-implemented method of claim 1, where obtaining the first document, identifying the set of documents, calculating the second relevance score, and calculating the final relevance score are repeated for each of a plurality of documents.

3. The computer-implemented method of claim 1, where at least one document, in the set of documents, is related to the first document by a similarity in authorship.

4. The computer-implemented method of claim 1, where at least one document, in the set of documents, is related to the first document by a similarity in publication source.

5. The computer-implemented method of claim 1, where the one or more documents, included in the same section of the publication, include news articles.

6. The computer-implemented method of claim 5, where at least one document, in the set of documents, and the first document are included in a same section of a publication.

7. The computer-implemented method of claim 1, where the set of documents includes postings to a message board.

8. The computer-implemented method of claim 7, where at least one document, in the set of documents, and the first document are associated with a same email address of a user that submitted the postings.

9. A system comprising:
   one or more server devices to:
      identify a first document;
      determine a first relevance score associated with the first document,
         when determining the first relevance score, the one or more server devices are to:
            compare a scoring criterion to the first document to determine the first relevance score;
      identify a set of documents related to the first document,
         when identifying the set of documents, the one or more server devices are to:
            identify one or more documents, in the set of documents, based on the first document and the one or more documents being associated with a same web site;
      calculate a second relevance score associated with the first document,
         when calculating the second relevance score, the one or more server devices are to:
            concatenate documents, in the set of documents, into a single pseudo-document, and
            apply the scoring criterion to the single pseudo-document to obtain the second relevant score,
            when applying the scoring criterion to the single pseudo-document, the one or more server devices are to:
               compare the scoring criterion to the single pseudo-document to obtain the second relevance score;
      calculate a final relevance score for the first document as a weighted sum of the first relevance score and the second relevance score; and
      transmit a ranked list of documents to a client device,
         the ranked list of documents including the first document,
         the first document being ranked, within the ranked list of documents, based on the final relevance score.

10. The system of claim 9, where the one or more server devices are to identify the first document, identify the set of documents, calculate the second relevance score, and calculate the final relevance score for each of a plurality of documents.

11. The system of claim 9, where at least one document, in the set of documents, is related to the first document by a similarity in authorship.

12. The system of claim 9, where at least one document, in the set of documents, is related to the first document by a similarity in publication source.

13. The system of claim 9, where the first document and the set of documents include news articles.

14. The system of claim 13, where at least one document, in the set of documents, and the first document are included in a same section of a publication.

15. The system of claim 9, where the first document and at least one document, in the set of documents, include one of:
   postings, of a same group, to a message board, or
   postings, of a same thread, to a message board.

16. The system of claim 9, where at least one document, in the set of documents, and the first document include postings to a message group, and
   where the first document and the least one document are associated with a same email address of a user that submitted the postings.

17. A non-transitory computer-readable medium storing instructions, the instructions comprising:
   a plurality of instructions which, when executed by a device, cause the device to:
   identify a first document;
   determine a first relevance score associated with the first document,
      one or more instructions, of the plurality of instructions, to determine the first relevance score including:
         one or more instructions to compare a scoring criterion to the first document to determine the first relevance score;
   identify a set of documents related to the first document,
      one or more documents, in the set of documents, being identified based on the one or more documents and the first document being associated with a same web site;
   calculate a second relevance score associated with the first document,
      one or more instructions, of the plurality of instructions, to calculate the second relevance score including:
         one or more instructions to concatenate documents, in the set of documents, into a single pseudo-document, and
         one or more instructions to apply the scoring criterion to the single pseudo-document to obtain the second relevance score;
   calculate a final relevance score for the first document,
      the final relevance score being based on:
         the first relevance score, and
         a value that is based on:
            the first relevance score, and
            the second relevance score; and
   transmit a ranked list of documents to a client device,
      the ranked list of documents including the first document,
      the first document being ranked, within the ranked list of documents, based on the final relevance score.

18. The non-transitory computer-readable medium of claim 17, where the plurality of instructions includes one or more instructions to identify the first document, identify the set of documents, calculate the second relevance score, and calculate the final relevance score, for each of a plurality of documents.

19. The non-transitory computer-readable medium of claim 17, where at least one document, in the set of documents, is identified based on a similarity in authorship between the at least one document and the first document.

20. The non-transitory computer-readable medium of claim 17, where at least one document, in the set of documents, is identified based on a similarity in publication source between the at least one document and the first document.

21. The non-transitory computer-readable medium of claim 17, where at least one document, in the set of documents, is identified based on the at least one document and the first document being:
   news articles of a same news source, or
   news articles of a same authorship.

22. The non-transitory computer-readable medium of claim 17, where at least one document, in the set of documents, is identified based on the first document and the at least one document being included in a same section of a publication.

23. The non-transitory computer-readable medium of claim 17, where at least one document, in the set of documents, is identified based on the at least one document and the first document being:
   postings, of a same topic, to a message board, or
   postings, of a same thread, to a message board.

24. The non-transitory computer-readable medium of claim 17, where at least one document, in the set of documents, and the first document are postings to a message group, and
   where the at least one document is identified based on the first document and the least one document being associated with a same email address of a user associated with the postings.

25. The non-transitory computer-readable medium of claim 17, where the value is obtained by multiplying the first relevance score by the second relevance score.

26. The system of claim 9, where the same web site is associated with:
   at least two hosts that are related, or
   at least two domain names that are related.

* * * * *